July 5, 1949.　　　　H. H. PLATT　　　　2,475,337
ROTOR BLADE
Filed June 21, 1945　　　　　　　　　　2 Sheets-Sheet 1
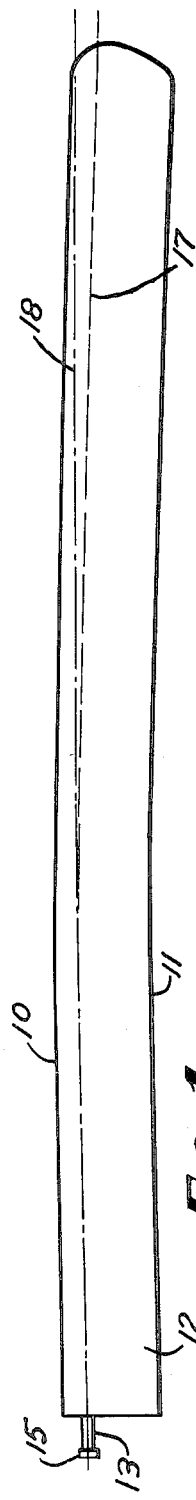
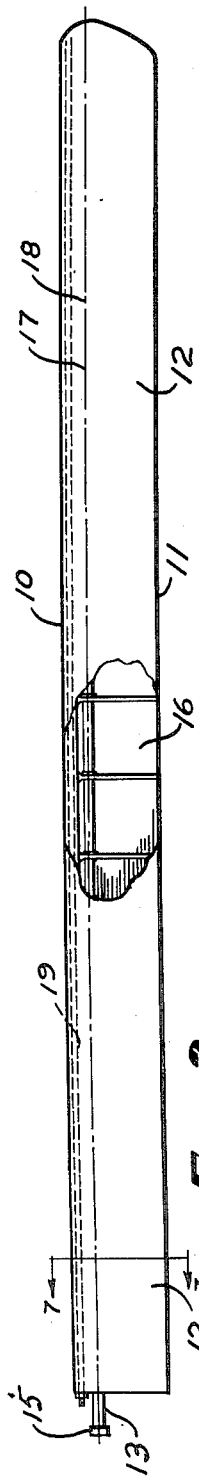
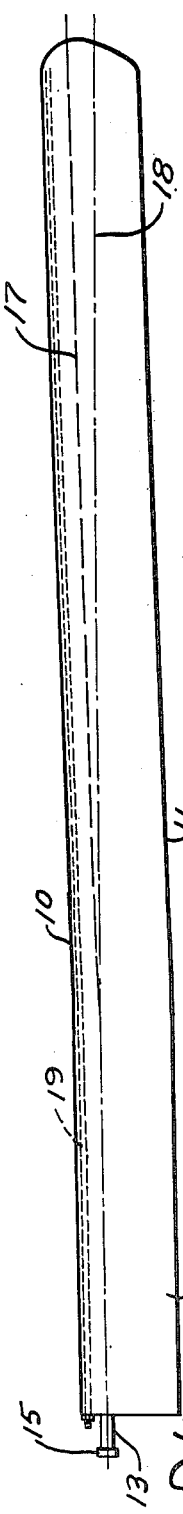
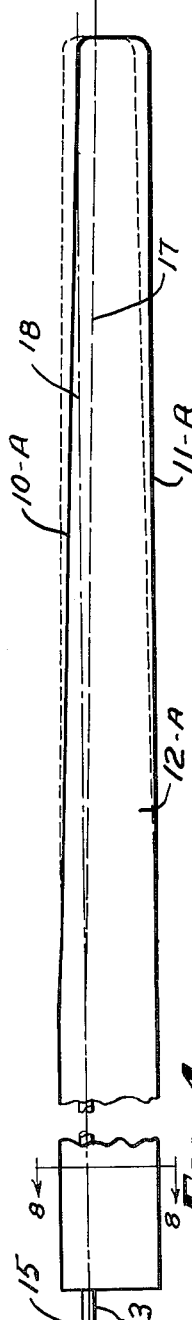
INVENTOR.
HAVILAND H. PLATT
BY
Leonard L. Kalish INVENTOR.
HAVILAND H. PLATT
BY Leonard L. Kalish Patented July 5, 1949

2,475,337

UNITED STATES PATENT OFFICE 2,475,337

ROTOR BLADE

Haviland H. Platt, New York, N. Y., assignor, by mesne assignments, to McDonnell Aircraft Corporation, St. Louis, Mo., a corporation of Maryland Application June 21, 1945, Serial No. 600,753

3 Claims. (Cl. 170—160.1)

The present invention relates to rotors for rotating wing aircraft and it relates more particularly to a new and improved airfoil construction for such aircraft.

An object of the present invention is to provide a new and improved construction for rotor blades of rotating wing aircraft. Another object of the present invention is to provide a rotor blade construction which will minimize rotary wing aircraft pitching moments, instabilities, flutter tendencies, stick vibration, stick forces, control uncertainties and structure vibration. Still another object of the present invention is to increase the structural strength of rotor blades.

Other objects and advantages of the present invention are apparent in the detailed description, appended claims and accompanying drawings.

It has, in the past, been the customary practice in the design of rotor blades for rotating wing aircraft to use an airfoil contour having a substantially constant center-of-pressure location. The aerodynamic characteristics of such airfoils, as is well known, are such that the center-of-pressure is located, approximately, at a position one-quarter of the chord length from the leading edge. Furthermore it has been found desirable and has been common practice to distribute the weight of the blade so that the center-of-gravity of each cross-section coincides in chordwise position generally with the center-of-pressure—that is, it is placed at the quarter-chord location also. The point of attachment to the hub is also customarily placed similarly relative to the inboard airfoil section in order to avoid unbalanced centrifugal force moments.

A further usual design condition has been to lay out the plan form of the rotor blade so that the line forming the locus of the quarter-chord points is a straight line passing through the torsional axis of the root end of the blade which may be defined as the axis about which the blade rotates in response to twisting moments applied near its tip.

In the simple case of a blade design having parallel leading and trailing edges, the above considerations merely require that the leading and trailing edges both be straight and that the attachment axis be located substantially in the extension of the quarter-chord line. In more complicated plan forms such as tapered, partly tapered, elliptical, etc., the conditions are met by laying out a straight line passing through the attachment axis and locating the leading and trailing edges of the blade so that at each station along the blade the leading edge is one-quarter of the chord length from the layout straight line.

While the substantially universal aim of rotary wing aircraft constructors has been to produce blades meeting the above requirement of a straight quarter-chord line passing through the attachment axis, in actual practice this desired form has not been attained with any degree of precision. Because of the exacting need for light-weight construction and because of the necessarily long and slender form of such blades, they are unavoidably subject to warping. The warping is the result of unequal shrinkage of the materials of fabrication which may be metal, wood, plastic, fabric, glue, cellulose dope, etc., in any of a number of detailed combinations. Regardless of the specific type of construction employed, the heavier parts, which are less subject to shrinkage, are necessarily concentrated toward the leading edge to make possible the balance requirement of having the center of gravity of each section substantially at the quarter-chord point. The greater shrinkage consequently takes place near the trailing edge with the result that the blade assumes a curved form, swept back with relation to the normal rotation direction.

It has been found in practice that the back-swept curvature developed in the blades hitherto used gives rise to seriously undesirable flight charactertistics of the aircraft on which they are installed, particularly when equipped with cyclic pitch control. The bad effects noted include: a rearward force on the pilot's control stick, or the equivalent, when flying forward; a strong tail-down pitching tendency of the aircraft as a whole under the same conditions; instability in turbulent air due to the fluctuation of the pitching tendency with variable wind speed; unpleasant maneuvering characteristics due to sudden changes of pitching tendency and stick force when changing flight speed; strong forces opposing displacement of the control stick in any direction under all flight conditions; objectionable vibration of the aircraft and objectionable vibration of the control stick.

The reasons which are ascribed by me to account for the above observed phenomena are: a cyclic shifting chordwise of the effective center-of-pressure of the blade, giving rise to a cyclic twisting moment of the blade; an increase of the torsional moment-of-inertia of the blade, leading to greater inertial resistance to pitch-control; a rearward displacement of the effective mass at the tip, causing a torsional flutter tendency; unequal curvature among the several blades of a rotor, producing unequal twisting moment-shifts which are transmitted to the control stick through the cyclic pitch change linkage; slackening of the surface of the envelope in the trailing edge region, leading to objectionable and unequal departures from the correct airfoil contour.

The cyclic chordwise shifting of the center-of-pressure is a component of spanwise shifting of the center of aerodynamic lift on a rotor blade as it revolves into and away from a relative wind. As is well known in the art of articulated rotors, the lift distribution over the forward moving blade is different from that over the rearward moving blade—the center of action being farther inboard in the advancing or forward moving position. When the center-of-pressure locus line is straight and in line with the torsional axis this in-and-out motion of the center of action does not lead to any shift of twisting moment about the torsional axis. When, however, the center-of-pressure line is at an angle to the torsional axis any fluctuation of the center of action to and away from the rotor rotation axis involves also a component of fluctuating motion in the sense of decreasing and increasing the length of moment arm about the torsional axis. Consequently, in forward flight the swept-back blade is subjected to a fluctuating twisting moment which tends to relative nose-up twisting of the blade when advancing and tends to relative nose-down twisting when retreating. Since both of these tendencies produce backward forces on a cyclic pitch control stick, conventionally arranged, and tail-down pitching moments on the aircraft, it is clear that the center-of-pressure fluctuation commutates, as a result of the rotor rotation, to produce steady forces on the stick and aircraft if the action is the same in all blades of a rotor. Since the lift force on a blade is quite large, even a dimensionally very small amount of center-of-pressure fluctuation gives rise to serious stick forces and pitching moments.

If the blade curvature varies among the several blades of a rotor, as it invariably does in practice on account of the inexact nature of shrinkage and warping tendencies, it is clear from the above discussion that the commutation of the fluctuating moments is incomplete. Therefore, a residual fluctuation will be transmitted to the stick and to the aircraft frame resulting in vibration of both.

Accordingly, the present invention contemplates the correction of the above described undesirable characteristics resulting from the methods of blade design and construction hitherto known in the art—that is, the elimination of rotary wing aircraft pitching moments, instabilities, flutter tendencies, stick forces, control uncertainties, stick vibrations and structure vibration.

Generally speaking, one phase of my invention comprehends the incorporation in rotor blades of any known type of adjustable straightening device. This may consist essentially of a tension member, preferably a metal rod or cable or tube, contained within the airfoil contour near the leading edge of the blade. The tension member is secured at each end to the main structural parts of the blade. For the maximum effect the attachments are near the tip and root ends of the blades and the tension member has nearly the same length as the operating portion of the blade. However, it may be considerably shorter, with the attachments at considerable distances from the root or the tip, without seriously impairing the effectiveness of my invention. In the latter case, the center-of-pressure line cannot be adjusted to an entirely straight line but is capable of being altered from a continuous back-sweep to a slightly reversed or S curve which departs by only an unimportant amount from a straight line. Experience in practice has shown that appreciable deviations from a true straight line are permissible provided that the mean of the departures from straightness approximately average out.

Adjustment of the tension in the tension member is preferably effected by the use of a screw thread and nut at one end of the rod, although any other of the many tension adjustment devices known in the art may be substituted, such as a slot-and-wedge, a cable-and-reel, a turnbuckle, shims of adjustable thickness, etc.

By means of the tension member and adjustment means a contracting tension force may readily be applied to the leading edge of the blade so as to overcome the shrinkage tension of the trailing edge portion and so deflect the blade into the desired shape. The amount of corrective deflection is under precise control in each blade so that it is a simple matter to adjust any number of blades to the same degree of straightness.

Experimental tests have been conducted with blades adjusted to varying degrees of straightness and the best results have been attained with the blades bent slightly forward rather than exactly straight. This result is believed to be due to the fact that the aerodynamic drag forces on the blade are so distributed as to tend to produce some back-swept deflection under flight conditions. Thus, if the blades are statically straight, they become slightly swept-back in operation. This tendency is neutralized by adjusting the tension member to produce a slightly forward sweep in the blades when not in rotation.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1 represents a diagrammatic plan view of a conventional rotor blade with parallel leading and trailing edges, showing the back-swept curvature resulting from warping.

Figure 2 represents a view similar to that of Figure 1 but showing the appearance of the blade with my straightening device installed and adjusted to bring the center-of-pressure line into straightness.

Figure 3 represents a view generally similar to that of Figure 2 except that the straightening device is adjusted to produce a forward-swept curvature.

Figure 4 represents a diagrammatic plan view of a partly tapered blade having back-swept curvature due to warping—the unwarped position of the blade being shown in dotted lines.

Figure 5:
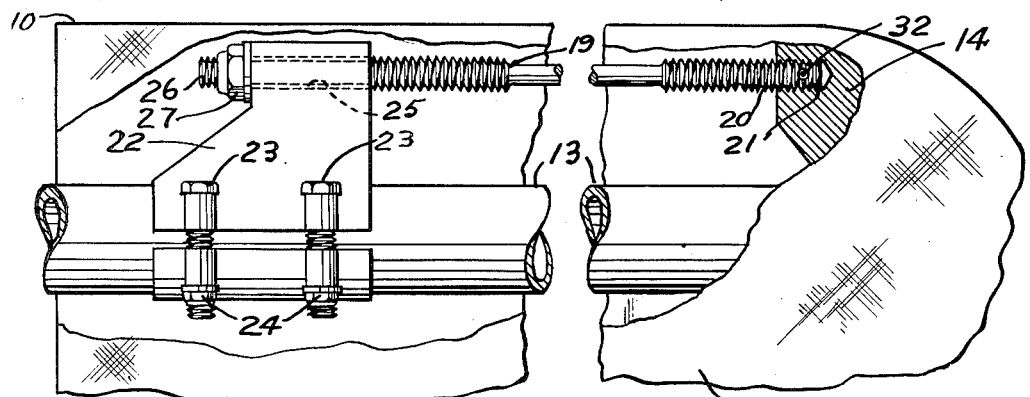
Figure 5 represents an enlarged plan view, partly broken away, of the embodiment of Figure 2, showing a means of attaching the ends of the tension member of my invention.

In Figure 1, I have shown a rotor blade having parallel leading and trailing edges 10 and 11 respectively, the aerodynamic envelope 12 having a suitable airfoil section which may be of substantially constant center-of-pressure type, constructed according to any of the methods well known in the art.

The blade of Figure 1 is provided with a tubular attachment spar 13 extending generally within said envelope 12 and to which the envelope is rigidly secured. The outboard end of the spar 13 is fastened to the rounded tip-block 14 of the blade in any suitable manner, while the inboard end of said spar emerges from the envelope 12 and carries a collar 15 (welded or otherwise immovably attached thereto) adapted for connection to the rotor hub (not shown)—there being two or more blades connected to the rotor hub as is well known in the art.

The locus line of the centers-of-pressure, located at the quarter-chord position of the individual spanwise-disposed airfoil sections 16 making up the blade of Figure 1, is indicated by the dashed line 17, while the torsional axis of the blade is indicated by the dash-dot line 18 forming a continuation of the axis of the undistorted inboard end of the spar 13.

In Figure 1, the center-of-pressure line 17 is shown deflected into a swept-back curvature as it is found in practice to be as a result of shrinkage warping of the envelope 12.

By use of the novel straightening means of the present invention, which will be hereinafter described in detail, it is possible to correct the swept-back curvature resulting from warping and to make the lines 17 and 18 coincide as shown in Figure 2.

Figures 7, 8:
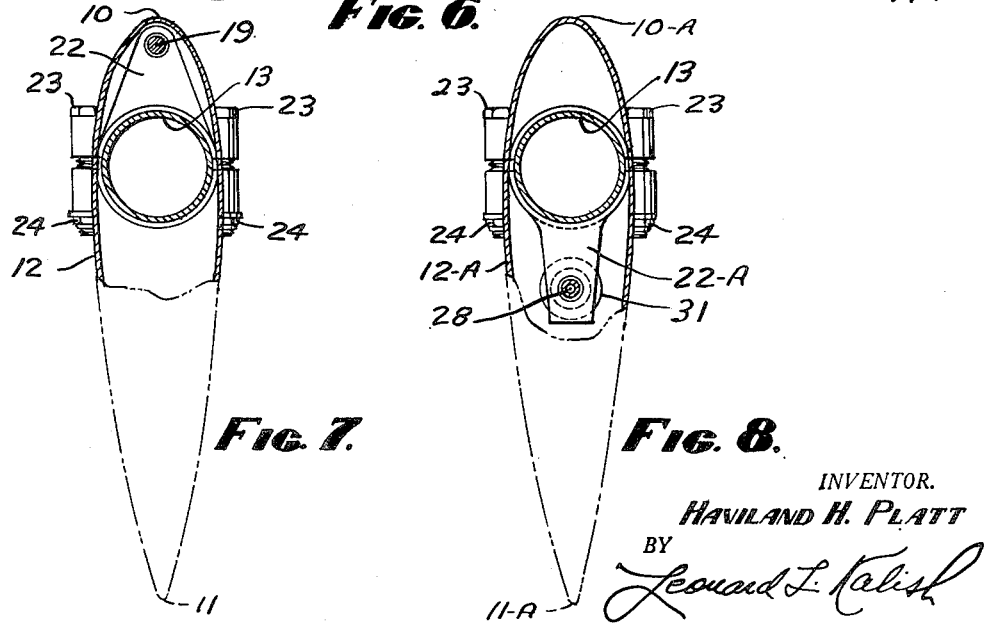
Figure 7 represents a cross-sectional view generally along the line 7—7 of Figure 2.
Figure 8 represents a cross-sectional view generally along the line 8—8 of Figure 4.

As shown particularly in Figures 5 and 7, the novel straightening device of the present invention may include an elongated rod 19 of metal or the like inserted within the leading edge contour of the blade. The rod 19 is threaded at its outboard end as at 20 for connection with a correspondingly threaded hole 21 in the forward portion of the tip-block 14, which is a formed member having substantial rigidity. A dowel-pin 32 locks the end 20.

A split anchorage clamp 22 is secured to the spar 13 by means of bolts 23 and nuts 24—the forward portion of said clamp having an opening 25 therethrough adapted to receive the inboard threaded end 26 of the rod 19.

An adjusting nut 27 is adapted screw-threadedly to engage the inboard end of the rod 19 and to adjust the blade curvature by placing tension in the rod 19 when screwed up, thereby compressing the leading edge of the envelope 12 into a shorter length and correspondingly stretching the trailing edge thereof.

The nut 27 may be screwed up until the leading edge 10 forms a straight line as shown in Figure 2. Alternatively, the nut 27 can be screwed up still further to bring the leading edge 10 and the center-of-pressure line 17 into the swept-forward position shown in Figure 3 to compensate for the tendency of the blade to be swept-backward during flight as discussed above. The optimum amount of forward curvature can readily be determined for any condition by appropriate block tests or flight tests which will show the position giving the smoothest flight and easiest control responses, etc.

In addition to the beneficial effects derived from eliminating the back-sweep of the center-of-pressure line, the stretching of the trailing edge of the envelope serves to tighten the surface covering and thus insure a surface which is markedly less deformed from a true airfoil contour by the air forces in flight.

In practice the torsional axis deviates slightly from the straight line 17 owing to the flexibility of the blade structure in the chordwise plane. Since the customary practice has been, however, to make blades comparatively very rigid in this plane, the deviation of the torsional axis from a straight line is in no case sufficient materially to affect the results.

Figure 6:
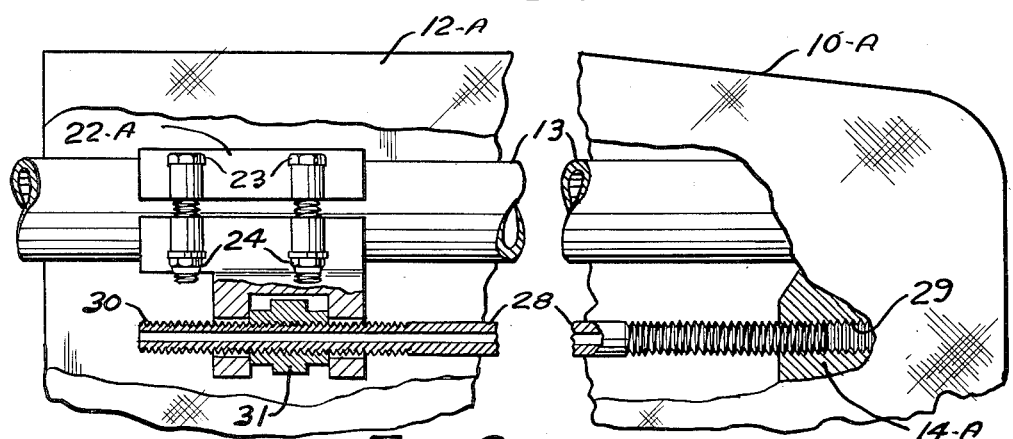
Figure 6 represents a view generally similar to that of Figure 5 but showing an alternative form of straightening device installed on the tapered blade of Figure 4.

In Figures 6 and 8, I have shown another embodiment of the present invention capable of use with any type of rotor blade but particularly useful with blades of the type shown in Figure 4 (having partly tapered leading and trailing edges 10—a and 11—a) wherein there is insufficient room at the outboard end to fasten a tension wire forward of the attachment spar 13.

In the embodiment of Figure 6, an expansion tube 28 is inserted within the envelope 12—a to the rear of the spar. The outboard end of the tube 28 fits within a socket 29 formed in the tip-block 14—a. The inboard end of the tube 28 is externally screw-threaded as at 30 and passes through an internally threaded collar 31 rotatably carried by the anchorage clamp 22—a.

It is apparent that the collar 31 can be turned to move the tube 28 outward against the tip-block 14—a thereby to correct the swept-backward position of the center-of-pressure line and to move said line to straight or swept-forward position as described above.

In addition to correcting the center-of-pressure and thereby providing smoother flight conditions, etc., the straightening member of the present invention furnishes valuable structural reinforcement for the rotor blade particularly in relieving the attachments of the envelope to the spar of the relatively heavy shearing loads which are developed when a bending moment is applied to the blade, as for example, in starting it in rotation.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what I claim as new and desire to protect by Letters Patent, is:

1. A rotor blade for rotating wing aircraft comprising an elongated envelope having an external contour of airfoil cross-section and having trailing and leading edges, elongated supporting means disposed within said envelope and extending substantially the length thereof, a tip block disposed within the envelope at the outer end thereof, said supporting means having its outer end connected to said tip block and having its inner end extending inwardly of the envelope for attachment to the hub of the rotating wing aircraft, an elongated rigid screw member disposed within said envelope in spaced relation to and substantially parallel with said supporting means, said screw member being substantially co-extensive in length with said envelope and connected at its outer end to the tip block, clamping means connecting said screw member to said supporting means adjacent the inner end of the screw member and rotating means on the screw member and abutting the clamping means to axially move said screw member to vary the spacing between the outer and inner ends of the supporting means to thereby vary the relative lengths of the trailing and leading edges of the blade.

2. A rotor blade for rotating wing aircraft comprising an elongated envelope having an external contour of airfoil cross-section and having trailing and leading edges, elongated supporting means disposed within said envelope and extending substantially the length thereof, a tip block disposed within the envelope at the outer end thereof, said supporting means having its outer end connected to said tip block and having its inner end extending inwardly of the envelope for attachment to the hub of the rotating wing aircraft, a substantially rigid tensioning member disposed within said envelope in spaced parallelism to said supporting means and being connected at its outer end to the tip block and extending substantially the length of the envelope, clamping means connecting the supporting means to the tensioning member adjacent the inner end of the latter and maintaining said tensioning member in its parallel relationship throughout its length, and means connected to the tensioning member and cooperating with the clamping means to axially move said tensioning member to vary the spacing between the outer and inner ends of the supporting means to thereby vary the relative lengths of the trailing and leading edges of the blade.

3. A rotor blade for rotating wing aircraft comprising an elongated envelope having an external contour of airfoil cross-section and having trailing and leading edges, elongated supporting means disposed within said envelope and extending substantially the length thereof, a tip block disposed within the envelope at the outer end thereof, said supporting means having its outer end connected to said tip block and having its inner end extending inwardly of the envelope for attachment to the hub of the rotating wing aircraft, a substantially rigid expansion member disposed within said envelope in spaced parallelism to said supporting means and being connected at its outer end to the tip block and extending substantially the length of the envelope, clamping means connecting the supporting means to the expansion member adjacent the inner end of the latter and maintaining said expansion member in its parallel relationship throughout its length, and means connected to the expansion member and cooperating with the clamping means to axially expand said expansion member to vary the spacing between the outer and inner ends of the supporting means to thereby vary the relative lengths of the trailing and leading edges of the blade.

HAVILAND H. PLATT.

REFERENCES CITED

The following references are of record in the file of this patent:

UNITED STATES PATENTS

| Number | Name | Date |
|---|---|---|
| 1,949,611 | Martens | Mar. 6, 1934 |
| 2,111,947 | Schackelford | Mar. 22, 1938 |
| 2,231,746 | Ballentine | Feb. 11, 1941 |
| 2,362,301 | Pecker | Nov. 7, 1944 |

FOREIGN PATENTS

| Number | Country | Date |
|---|---|---|
| 130,825 | Great Britain | Aug. 14, 1919 |

OTHER REFERENCES

Airplane Mechanics Rigging Handbook, Hartz and Hall, published by Ronald Press Co., New York.